United States Patent [19]

Ferris

[11] 4,350,358
[45] Sep. 21, 1982

[54] AUXILIARY LOAD-CARRYING APPARATUS

[76] Inventor: Tom E. Ferris, 4010 Wyne, Houston, Tex. 77017

[21] Appl. No.: 903,861

[22] Filed: May 8, 1978

[51] Int. Cl.³ .................................................. B60P 1/00
[52] U.S. Cl. ................................. 280/81 R; 180/24.01
[58] Field of Search ................ 280/81 R, 81 A, 81 B, 280/81.5, 43; 180/24.01, 24.02

[56] References Cited

U.S. PATENT DOCUMENTS

| | | | |
|---|---|---|---|
| 2,415,706 | 2/1947 | Ronk | 280/81 R |
| 2,902,289 | 9/1959 | North | 280/81 R |
| 3,038,704 | 6/1962 | Cook | 280/81 R |
| 3,112,100 | 11/1963 | Prichard | 280/81 R |
| 3,175,841 | 3/1965 | Smith | 180/24.02 |
| 3,298,706 | 1/1967 | Lyall | 280/81 R |
| 4,079,798 | 3/1978 | Ferris | 180/24.02 |
| 4,084,833 | 4/1978 | Mohrbacker | 280/81 A |

*Primary Examiner*—John J. Love
*Assistant Examiner*—John A. Carroll
*Attorney, Agent, or Firm*—John A. Young

[57] ABSTRACT

This invention relates to an auxiliary load-carrying apparatus for use with such load-carrying vehicles as self-transit concrete mixer trucks.

The apparatus consists of two power-actuated devices having ground-engageable wheels which are selectively movable between raised-transport position and lowered ground-engaging position in which a portion of the load of the vehicle is transferred onto the ground engaging wheels of the auxiliary load-carrying apparatus. A load-carryng device is located one at each side of the vehicle and is articulated so that the wheels of the load-carrying device can move relatively freely in any one of three dimensions of movement so as to conform to the surface of the highway, or ground, by which vertical support is provided the vehicle.

The auxiliary load-carrying device which shares a significant portion of the vehicle load, is connected through a king pin and swivel connection to the vehicle in such a manner that the auxiliary load-carrying apparatus imparts no instability-creating forces on the vehicle because of failure to track with the turning movements of the vehicle. The auxiliary load-carrying apparatus functions distinctly but complimentarily with the vehicle in that it receives an operator-selected proportion of ground load, sustains such load notwithstanding changes of terrain, but imparts no instability-creating extraneous forces to the vehicle interferring with the vehicle's normal steering and operating functions.

9 Claims, 7 Drawing Figures

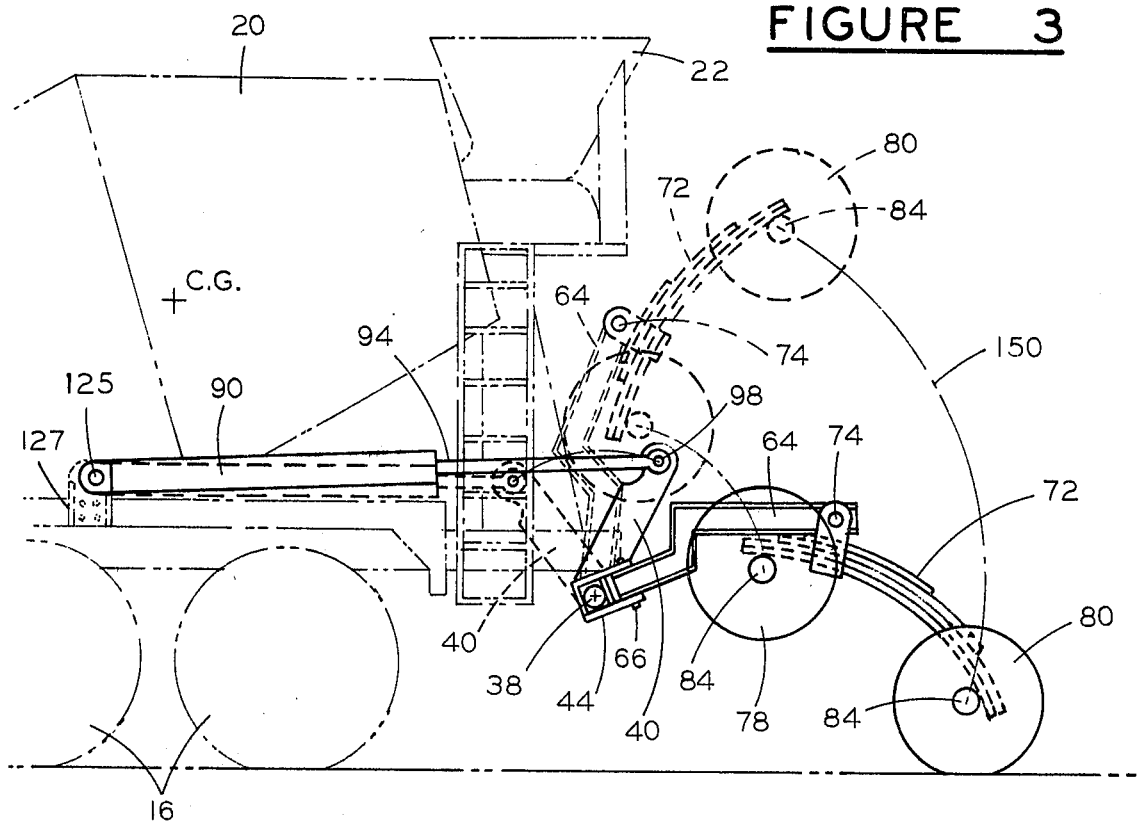
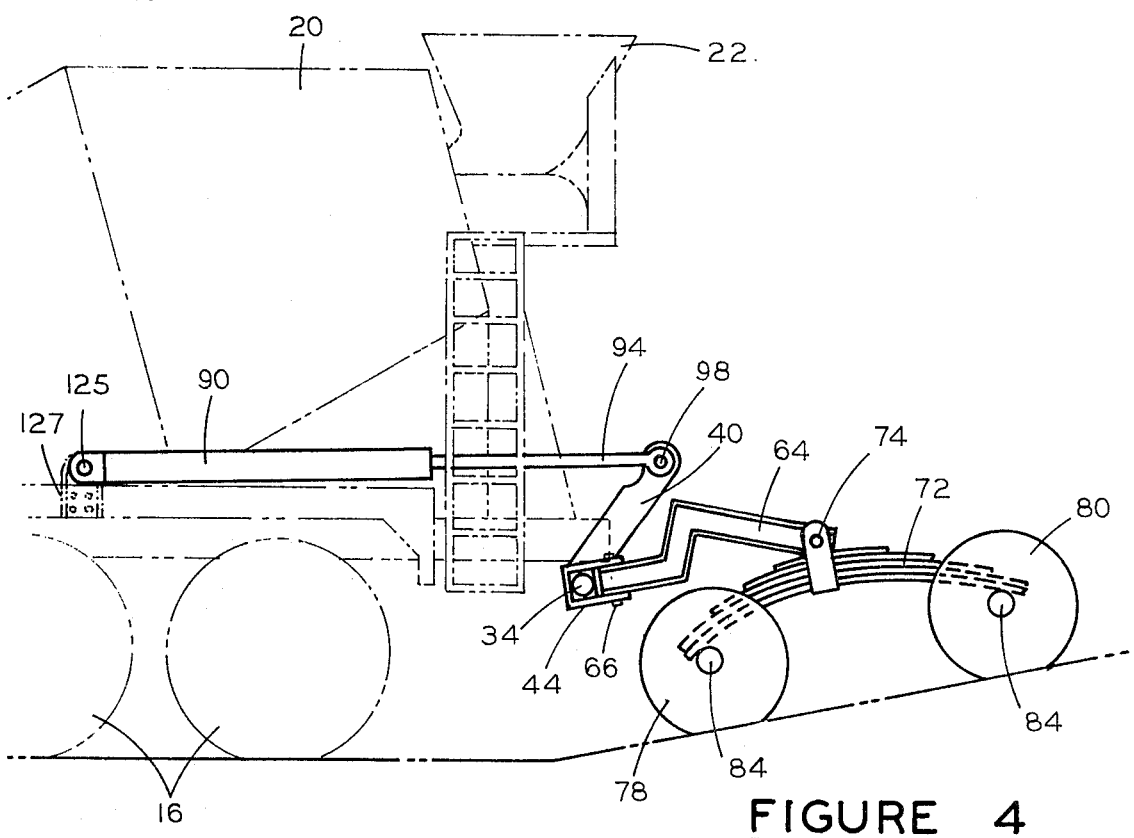

AUXILIARY LOAD-CARRYING APPARATUS

BACKGROUND OF THE INVENTION

Auxiliary load-carrying apparatuses are known in the art and have gained some limited recognition as a means for solving the problem of meeting state and federal regulations which prescribe load per axle and loading per-axle per-unit-displacement between axles (the so-called "bridge laws").

While the principle of providing operator-controlled auxiliary load-carrying apparatuses is simple enough, and while the need for such devices is generally recognized, the obtainment of certain constructional and operational parameters has not been so readily obtainable. For example, load-carrying devices which selectively move from vertical raised position to lower ground-engaging position, can unduly interfere with other normal and expected functions of the vehicle, i.e., they impart instability to the vehicle, causing it to swerve, or interfere with the steering, turning, and other maneuvering functions of the vehicle. Quite obviously this is an intolerable situation. Also, in raised or transport position, auxiliary load-carrying devices tend to raise the center of gravity of the vehicle, making it unstable and unwieldy. A substantial overhead load has the effect of raising the center of gravity of the vehicle as a whole, so that centrifugal force during turning develops the greater effect of tending to tip the vehicle over, or introduces objectionable sway. Overturning a vehicle, such as a self-transit concrete mixer truck, is not an uncommon occurrence. The vehicle itself is inherently unstable. This undesirable condition is then compounded with other unstable-creating effects arising during turning of the vehicle with a sloshing load of concrete within the mixer bowl. There is, therefore, a risk of either overturning the vehicle or requiring that the vehicle operate at such low speeds, and with such degree of caution, that it slows down the normal delivery functions of the concrete by the driver. This is not to say prior art auxiliary load-carrying devices are inoperative; within narrow confines, they do operate, and do relieve at least a portion of the axle loading; but the apparatuses impose an unacceptable design tradeoff in that the benefits to be gained by reduction of axle loading are offset by cumbersomeness of the machinery for effecting the result, introducing problems of instability to the vehicle for its normal steering and transport functions, and, furthermore, create unstable conditions of steering and maneuverability of the vehicle whether the load-carrying apparatus is in raised or lowered positions.

At lowered position, the instability described generally results from the relatively inflexible nature of the frame and wheel support provided by the auxiliary load-carrying apparatus. The apparatus has a different steering radius as compared with the vehicle, with the result that the vehicle and load-carrying apparatus oppose each other during turns, the equipment is unduly stressed, and the normal functions of steering and maneuvering the vehicle are impaired. These unsolved problems have confronted the art for many years.

SUMMARY OF THE INVENTION

It is a principal object of the present invention to provide an auxiliary load-carrying apparatus which is remotely operable to control the amount of load to be sustained by such apparatus and wherein the apparatus is capable, by means of a series of articulated connections, to conform to whatever irregularities of terrain that the vehicle might traverse.

It is another object of the present invention to provide an auxiliary load-carrying apparatus by means of a pair of auxiliary load-carrying devices one at each side of the vehicle, such devices being differentially loaded, if needed, to provide greater lateral support for the vehicle at one side than at the other, this being a common requirement where softer terrain is encountered at one side of the vehicle than at the other.

Another object of the present invention is to provide an auxiliary load-carrying apparatus which is capable of tracking behind the load-carrying vehicle so that as the vehicle is steered or otherwise maneuvered over the highway, the load-carrying device will track accurately and follow the same turning radius and without imposing extraneous loads which develop instability in the load-carrying vehicle.

A further object of the present invention is to provide an auxiliary load-carrying device one at each side of the vehicle and each consisting of two pairs of wheels, one pair at each end of longitudinal leaf springs which are held pivotally by a linkage to the towing vehicle, the connection with the towing vehicle providing compound turning movement in a horizontal plane and pivotal movement in a vertical plane. Thus, a combination of the turning movements in a horizontal plane and vertical at the point of connection of the towing vehicle, together with pivotal connection between the linkage and the leaf springs, allow each wheel of the auxiliary device to follow any irregular contours of the terrain while it continuously sustains a normal force of engagement with the ground and provides auxiliary weight support.

Another important object of the present invention is the use of leaf spring supports for the pair of wheels which is connected to the tow linkage at a location offset from the balance point so that when lifting movement is exerted through the linkage on the auxiliary load-carrying device, the wheels are removed from the ground in stages, and follow a prescribed path leading to an elevated, nested transport position in which such auxiliary load-carrying apparatus is stored in a vertical upward position with portions one at each side of the center of gravity of the vehicle so that the apparatus does not substantially contribute to an elevation in the center of gravity of the towing vehicle. By maintaining the center of gravity the same, whether the apparatus is in raised or lowered position, the apparatus will not contribute to vertical instability of the vehicle which would otherwise occur should the center of gravity be raised when the auxiliary load-carrying apparatus is elevated.

Another important object of the present invention lies in the ability of each wheel of the auxiliary load-carrying device to deflect in a vertical plane containing the axis of rotation of the wheel so that the camber angles of the wheels can vary against the torsional resistance of the leaf spring responsively to normal load shocks. The resilience of the leaf springs will, of course, return the wheels to their proper camber angle when the distortion-producing forces are relieved.

An overall object of the present invention is that the auxiliary load-supporting apparatus can be retrofitted onto existing vehicles, such as self-transit concrete mixer trucks or other load-bearing vehicles, and does not require a subframe. Thus, the device can be readily installed and is actuatable remotely from the cab of the vehicle to bring the auxiliary load-carrying apparatus into either elevated transport position or downwardly into ground-engaging position to share a portion of the load. Either when elevated or raised, the apparatus is positionable so as not to interfere with the normal function of the vehicle's other operations. For example, in the self-transit mixer, the apparatus is located so as not to interfere with the chute, hopper, or drum and in no way impedes the normal function of either the self-transit mixer or other functions of a load-carrying vehicle.

Other objects and features of the present invention will become apparent from a consideration of the following description, which proceeds with reference to the accompanying drawings.

DRAWINGS

FIG. 3 illustrates the load-carrying device at one side of the vehicle during the lifting procedure, progressing first from the full-line position of FIG. 2 to the full-line position of FIG. 3, and further raising, producing the dotted line position of FIG. 3;

FIG. 4 illustrates the apparatus of FIG. 2, showing the towing vehicle and auxiliary load-carrying apparatus on different inclination terrain but without disrupting the normal operation;

Figure 5:
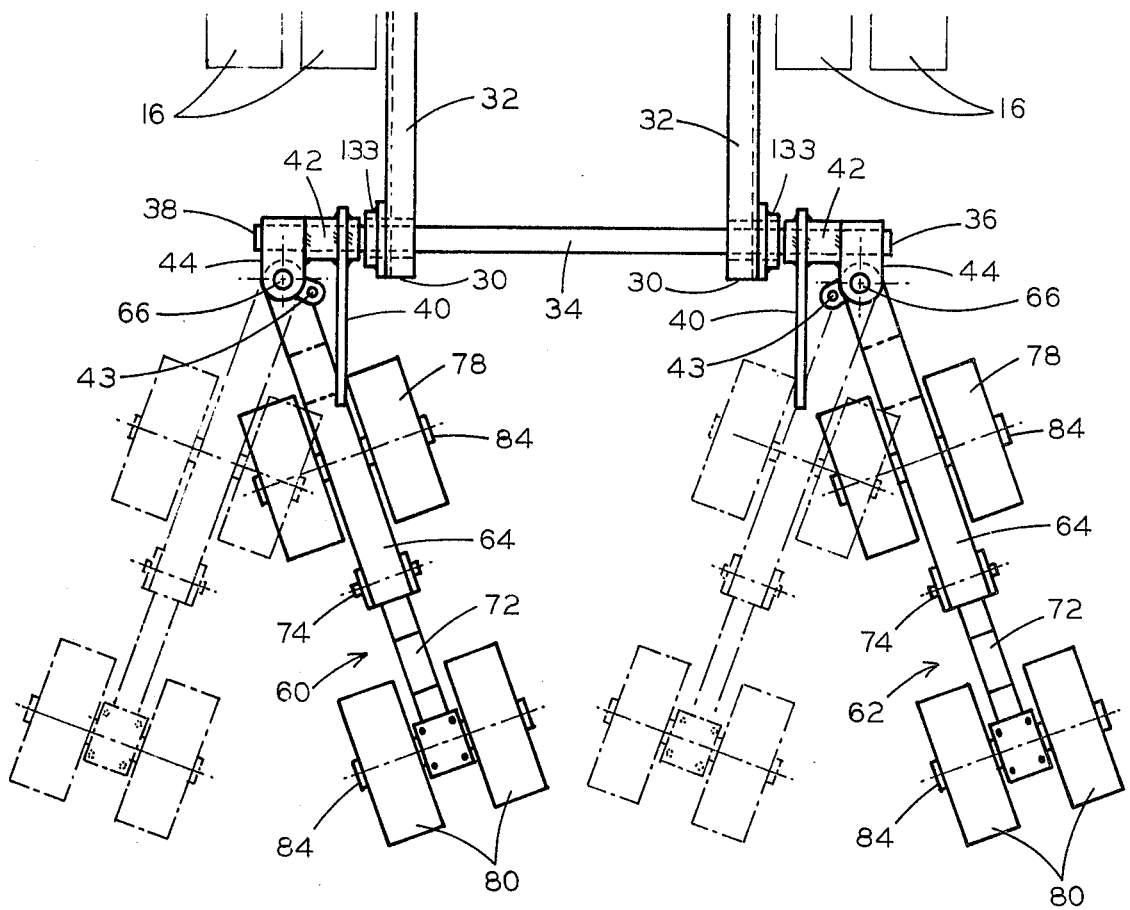
Figure 6:
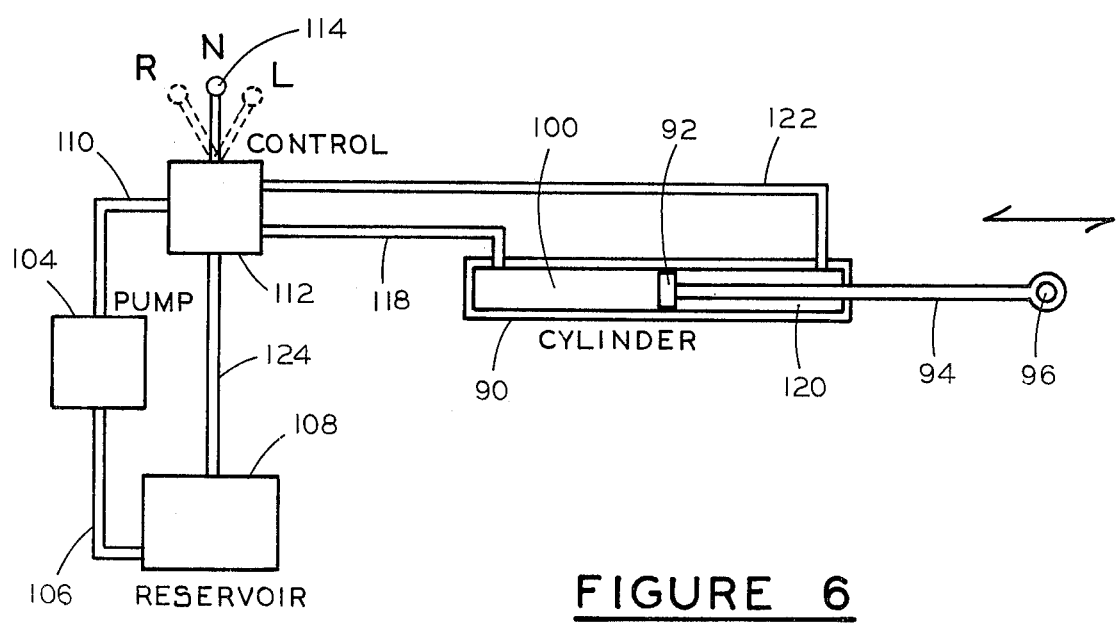
Figure 7:
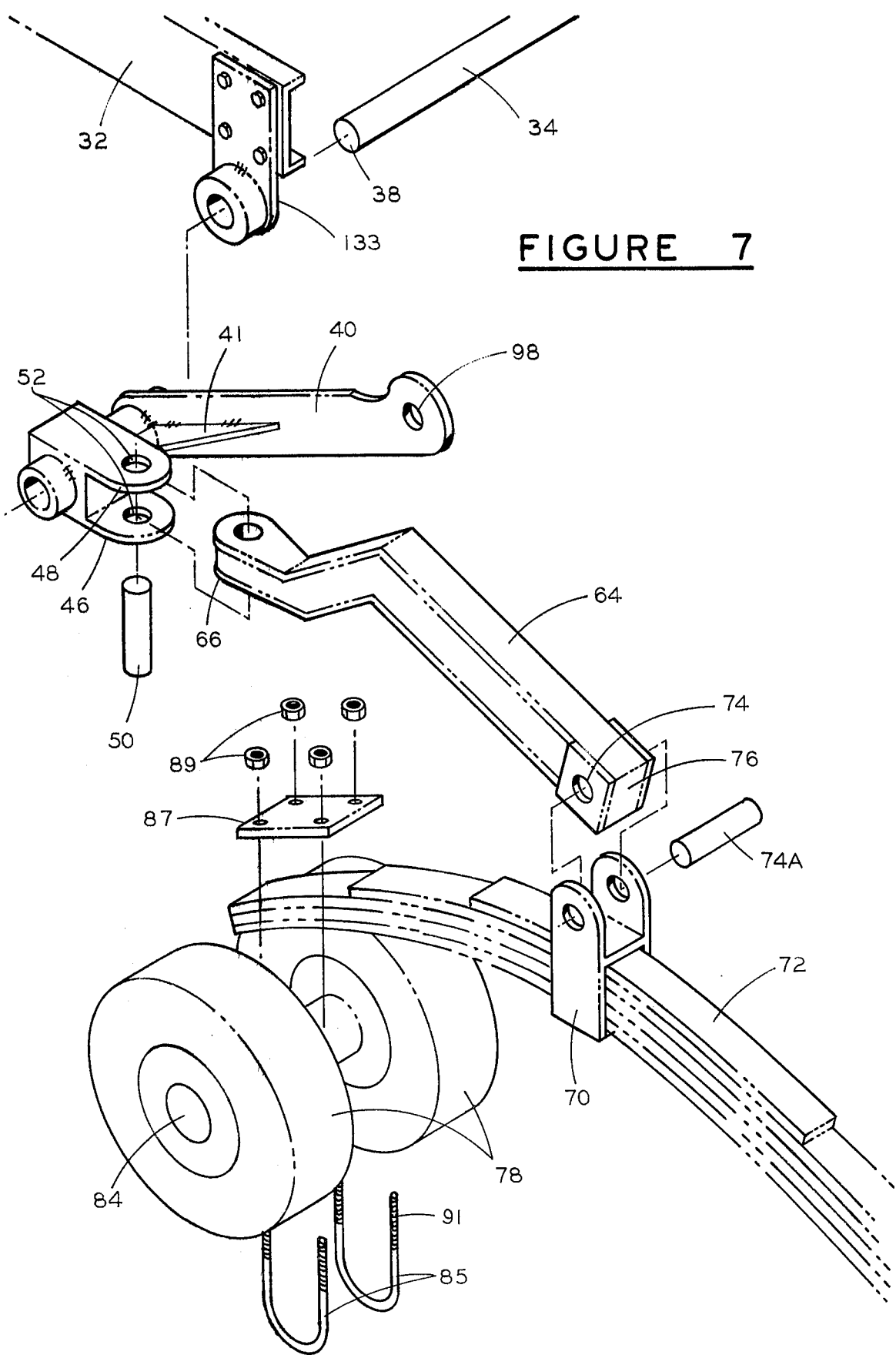

FIG. 5 is a top view illustrating the frame of the load-bearing vehicle and two extreme steering positions for the auxiliary load-carrying apparatus, the full-line position illustrating the position of the auxiliary load-carrying apparatus which automatically occurs during a right-hand turn of the vehicle and the dotted line position showing the other extreme angular position for the auxiliary load-carrying apparatus, automatically assumed during a left-hand turn by the vehicle;

FIG. 6 illustrates schematically the hydraulic system for biasing the auxiliary load-carrying apparatus downwardly against the ground to effect the preferred proportion of load-sharing between the vehicle and the auxiliary load-carrying device, this system also being used for elevating the apparatus from a lowered position to a raised position illustrated in FIG. 3; and FIG. 7 is an isometric exploded view illustrating the leaf spring beams which support the pairs of wheels at opposite ends thereof for auxiliary load-carrying function and further illustrating details of the load-bearing axle at the rear end of the frame.

DETAILED DESCRIPTION OF THE INVENTION

Figure 1:
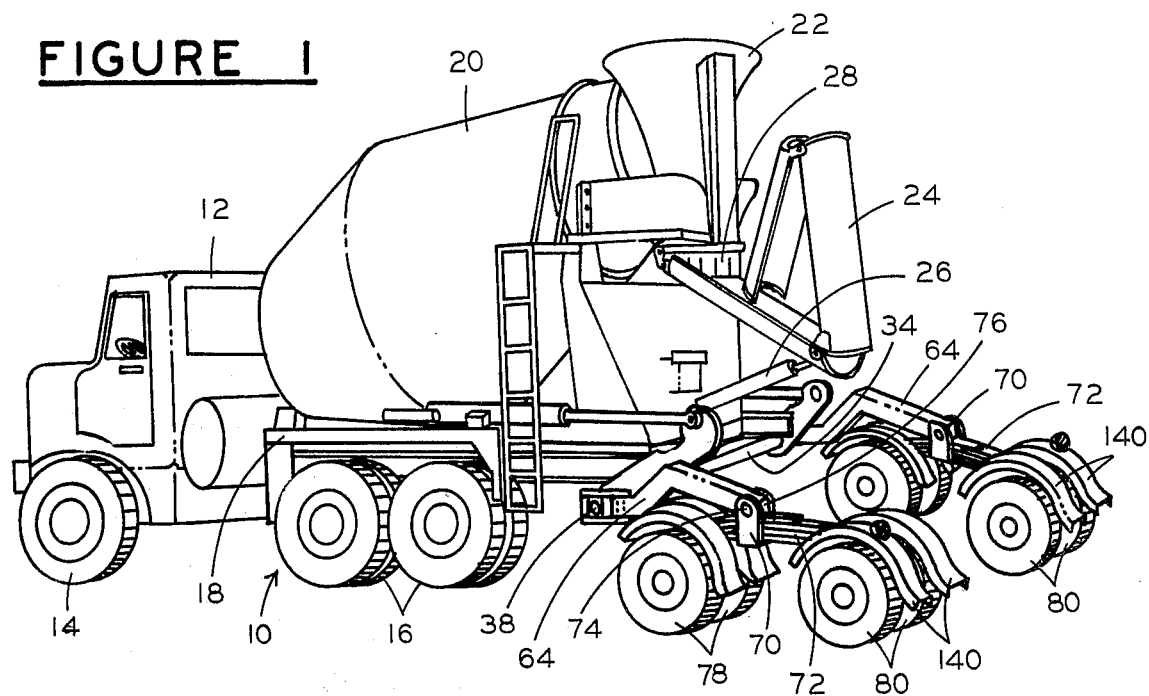
FIG. 1 is an isometric view of a load-carrying device, in this instance a self-transit concrete mixer unit having auxiliary load-carrying apparatus with one device at each side of the vehicle, at the rear thereof, and corresponding with the present invention.

Referring to FIG. 1, a self-transit concrete mixer truck designated generally by reference numeral 10 includes a cab 12, ground engaging front wheels 14 which are steerable and rear wheels 16 which support through a frame 18 a rotatable mixer drum 20 having a charging hopper 22 and chute 24 through which the concrete is directed when it is discharged by counter-rotation of the drum 20. The chute position is controlled angularly by means of a fluid motor actuator 26 and the chute 24 is angularly positionable by rotation about a turntable 28 which receives the discharging concrete from the open end of the mixer drum 20.

At the rear 30 of frame rails 32 (FIG. 5), is circular cross section axle beam 34 having ends 36,38 which provide bearing support for angular movement of lever 40, there being one lever 40 at each of opposite sides of the vehicle frame 18.

Each lever 40 has an integrally related sleeve 42 journaled for rotatable movement about axle beam 34 and further includes two lugs 46,48 with a journal pin 50 received through aligned openings 52 in the two lugs 46,48. It is through this journal pin 50 that each of the two auxiliary load-carrying devices (designated generally by reference numerals 60,62) are attached to the vehicle. Each of the two identically constructed auxiliary load-carrying devices consists of an obtusely angled strut 64, each with a bushing 66 attached to the journal pin 50. Thus, as shown in FIG. 5, the auxiliary load-carrying device can move pivotally about the journal pin 50 to provide for different steering angles as the auxiliary load support devices 60,62 track behind the vehicle when the vehicle undergoes a turn.

Because each sleeve 42 turns about axle beam 34, such turning movement raises the auxiliary load-carrying devices 60,62 since the sleeve effects rotational lifting movement through the lugs 46,48 and the journal pin 50, through the obtusely shaped strut 64, thereby raising, lowering, and biasing the auxiliary load-carrying devices 60,62 with the preferred ground engagement force.

Each strut 64 is secured through a U-shaped clamping device 70 to a stack of leaf springs 72 which act as a beam. The point of engagement of the U-shaped clamping device is geometrically offset in the direction of the front of the leaf spring beam for a purpose which will be later explained. A pivot, or hinged, connection 74 is provided between end 76 and U-shaped clamping device 70 so that a front set of wheels 78 and rear set of wheels 80 are journaled at opposite ends of the leaf spring beam 72 and rock slightly about this pivoted connection 74 provided by pin 74a. Thus, as the front pair of wheels 78 moves over a stone, rock, or the like, the front pair or set of wheels can ride up and over such obstruction while the rear set of wheels 80 remains in ground engagement.

Because the leaf spring beam 72 can twist slightly (FIG. 2), the axle connection 84 for the pairs of wheels 78,80 can twist the leaf spring beam slightly, thus varying the camber angle of the wheels, with respect to the ground. The axle 84 is clamped by U-shaped clamps 85 through plate 87. Threaded ends 91 pass through openings in plate 87 and nuts 89 are used to clamp axle 84 to the end of the leaf spring beam 72. This slight torsional movement is permitted so that the wheels and entire load-sharing mechanism can yieldably conform with virtually any variety of ground-encountered obstructions and still remain in ground engagement and at the same normal force. Thus, front wheels 78 can move over stones, mounds, and follow any irregular ground contact relative to the rear set of wheels 80, either of the auxiliary weight-supporting devices 60,62 is free, one device 60 independently of the other, 62, to follow the particular terrain conditions encountered at opposite lateral sides of the vehicle. Each set of wheels can assume whatever camber angle it may be temporarily distorted to, by reason of the torsional yieldability of the leaf spring beam 72 and each load-supporting device can assume whatever attitude is necessary relative to the longitudinal axis of the vehicle as shown in FIG. 4. Thus, should the vehicle be in a different grade than the auxiliary load-bearing device, each is independently capable of remaining in full engagement not-withstanding the difference in grade, the condition of FIG. 4 being permitted because of the turning about pin 74 of leaf spring beam 72.

While all of these articulated connections described permit the individual and cumulative adjustable movements of the ground-engaging wheels on the auxiliary load-supporting device, the load-supporting device is also free to "track", i.e., to follow the turning radius of the vehicle, since each device 60,62 can turn on its king pin 50, this being the result for shallow-turning angles, sharp-turning angles, and compound turning, i.e., S-shaped turns.

Referring to FIG. 6, the device is raised by means of a power cylinder 90 having a piston 92 and piston rod 94 with a circular opening 96 having a pin connection 98 with lever 40. Lever 40 can be reinforced by means of a gusset plate 41 connecting to the bearing sleeve in the manner indicated in FIG. 7.

Figure 2:
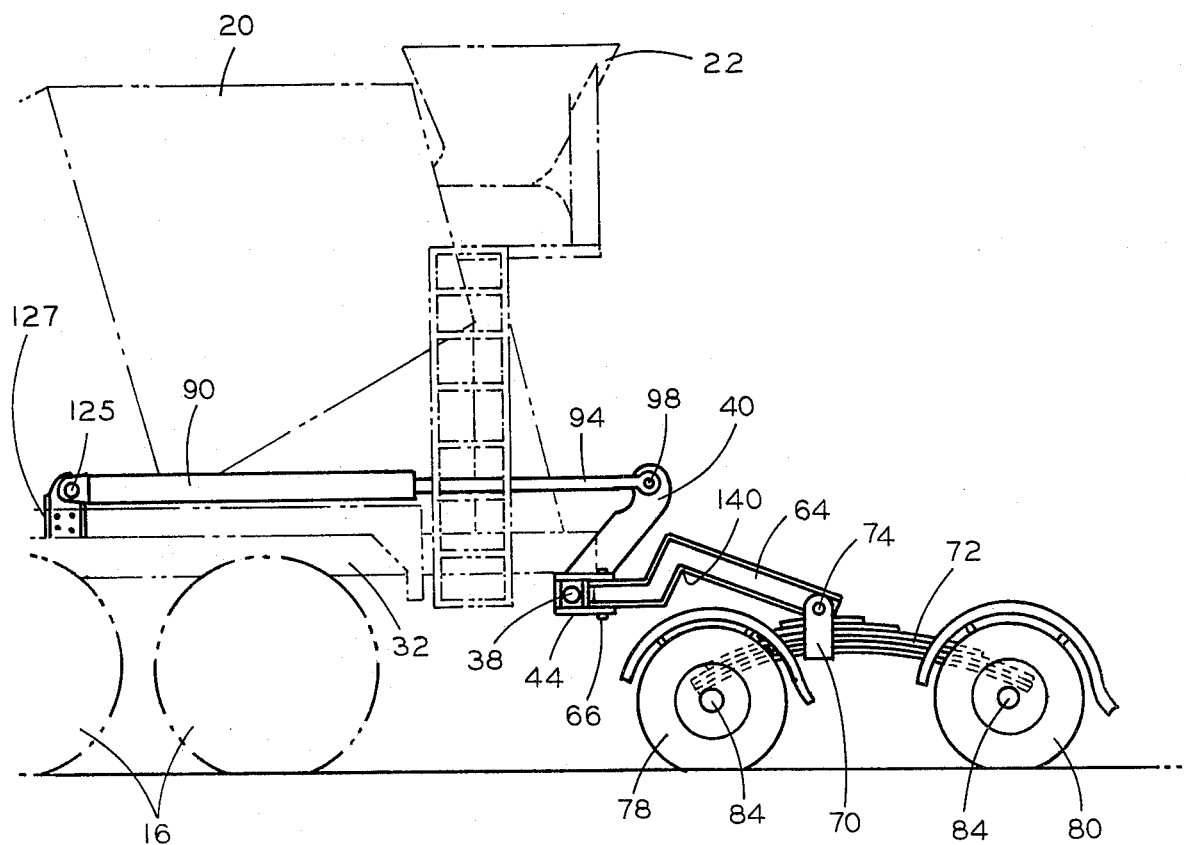
FIG. 2 is a side elevation view illustrating the self-transit mixer of FIG. 1 in phantom view and illustrating the auxiliary load-carrying apparatus in full view.

When it is desired to bias the auxiliary load-carrying device in a downwardly direction, piston 92 is biased to the right, introducing fluid into the variable volume chamber 100. Hydraulic pump 104 has fluid connection 106 through reservoir 108 and power supply line 110, and control valve assembly 112 with a control lever 114 having a neutral position "N", lowering position "L", and raising position "R". When the control handle 114 is moved to the position indicated by the letter "L", line 110 is connected through 112 in line 118 to the variable volume chamber 100 expanding that chamber and biasing the piston 92, piston rod 94 toward the right and pivoting lever 40 together with its bearing sleeve in a clockwise direction (FIG. 2). During lowering, the variable volume chamber 120 exhausts fluid through line 122 through control valve assembly 112 and return line 124 to the reservoir 108.

When it is desired to raise the auxiliary load support device, control handle 114 is moved from the "N" position, or neutral position, to the "R" position designating the "raising" position, at which time the pump 104 having pressure line 110 is communicated through the control valve assembly 112 through line 122 to chamber 120 biasing the piston 92 to the left, together with the piston rod 94, thus rotating the lever 40 in a counter-clockwise direction about the axle beam 34 (FIG. 2) mounted through bracket 133 bolted to frame rails 32. Fluid form contracting chamber 100 (FIG. 6) is exhausted through line 118 and control 112 through return line 124 to reservoir 108. As shown, the pump 104 is always replenished with hydraulic fluid from the reservoir 108 through supply line 106.

When the device is initially caused to move into raising position, the axle 84 (FIG. 2) moves upwardly and engages the nock 140 (FIG. 2) because the obtusely angled linkage 64 is connected through U-shaped clamp 70 in a direction which is geometrically offset from the balance point between the front set of wheels 78 and rear set of wheels 80; thus, the wheels 78 are initially lifted upwardly as indicated. There is a compound angular movement, the first compound angular movement occurring by turning of the lever 40 and its bearing sleeve about axle 34. This likewise causes the obtusely angled strut 64 to turn with the sleeve, because the sleeve and lugs are attached to linkage 64 through the journal pin 50. Once the axle 84 engages the undersurface of linkage 64, further rotational movement of linkage 64 together with lever 40 raises the rear set of wheels 80 which describe a vertically upward movement about an arc labeled 150 in FIG. 3. This angular upward movement continues until the rear set of wheels 80 is fully raised. In a fully raised position, the rear set of wheels 80 is displaced to the right of pivot connection 74. The raised rear wheels 80 are vertically hung so that they create a moment about 74, tending to hold the axle 84 for the front wheels 78 against the underside of the linkage 64.

The linkage is locked by dropping a lock pin (not shown) through aligned openings 43, in bearing sleeve 44 and mounting beam 64.

OPERATION

In operation, each auxiliary load-carrying device 60-62 is held in a raised transport position when the vehicle 10 is not carrying load. The auxiliary load-carrying devices are also raised when, in the case of self-transit concrete mixer units, the device is operated in the concrete discharging mode. While such auxiliary load-carrying devices are raised, the chute 24 is extended, the mixer drum 20 is counter-rotated, and the concrete contents are discharged through the open end of the mixer drum and into the chute 24, with the chute 24 being swingable to direct the concrete where it is needed at the job site.

One of the important features of the present invention is that, in the raised position, the auxiliary load-carrying devices do not interfere with any of the normal operations of charging concrete mixture to the interior of the mixer drum 20 through the charge hopper 22, nor do they interfere with the discharging functions of the transit mixer truck, since the drum is counter-rotatable to effect discharge of the contents of the drum and into the chute 24 which is readily swingable without interference by the auxiliary load-carrying devices in their raised positions. It should be understood that the load-carrying devices are raised while the vehicle is in its discharging mode and are not required at this time, since the vehicle is not traveling down the highway and is either stationary or maneuvered under very low speed to help in locating the concrete as it is discharged and directed from the chute 24 at the building site.

In the raised position (referring to FIG. 3), the center of gravity is labeled "C.G."; a horizontal line through the point "C.G.", substantially bisects the line connecting the axle of the front wheels 78 and rear wheels 80. Because of this division of weight distribution above and below the horizontal line passing through the center of gravity of the vehicle, the auxiliary load-carrying device in its raised position does not cause the center of gravity to be raised as in previous devices. The higher the center of gravity, of course, the more unstable the vehicle in making turns or other maneuvers. It is, therefore, one of the important features of the present invention that, in the raised position, the auxiliary load-carrying device does not affect in any substantial manner the location of the center of gravity and, therefore, imparts no factor of instability of the vehicle as is the case with prior art devices of the character and type described. When it is desired to lower the auxiliary load-carrying devices to relieve axle-loading associated with wheels 14,16 of the vehicle 10, handle 114 is operated from the cab which is displaced into the "L" position (FIG. 6), communicating pressure from pump 104 through line 110 and line 118 to the chamber 100, displacing the piston 92, piston and piston rod 94 to the right (FIG. 6). There is a power cylinder pivotally mounted at 125 on mounting plate 127 associated one on each side of the vehicle and each is independently operated.

The auxiliary load-carrying devices are then rotated from the position shown in FIG. 3 to the full-line position in FIG. 2. An important feature of the present invention is that each device can be differentially operated so that greater support can be provided at one side of the vehicle as compared with the opposite side. This can be a very useful result when it is desired to provide greater lateral support at one side of the vehicle than at the opposite side because of different terrain conditions or because a greater amount of vehicle load is sustained at one side or the other during mixing.

When the auxiliary load-bearing devices are in the down position and the vehicle is moving, each device 60,62 is independently movable so that as the vehicle turns, each is free to move on its respective king pin connection 50. It is important that this be so, since, referring to FIG. 5, should the vehicle be turning to the right, the inboard device 62 has to assume a different turning radius than the outboard device 60. Should the two devices 60,62 be rigidly interconnected as in previous devices, or rigidly connected to the vehicle, as in still other devices, then back end "swerve" developed by the auxiliary devices is communicated to the vehicle so that the rear of the vehicle is biased inertially out of its turning radius, with the result that lateral skid forces are produced on the vehicle. This is because all of the wheels are not turning about the same center. The described objectionable forces on the vehicle tend to tilt it, or tip it. In those cases where the vehicle is fully loaded and the center of gravity is high, such biasing forces can and have produced tipover of the vehicle. This situation is totally obviated in the present invention, since each of the auxiliary load-carrying devices is free to assume whatever position is appropriate for a vehicle turn, and all of the objectionable inertial loadings which could create instability in steering, are eliminated, since each device 60,62 is at all times free to respond through the king pin 50 to assume the correct position. This result applies for shallow turns, sharp turns, and S-shaped turns.

The devices 60,62 are capable of encountering different road conditions from the front to the rear of the device, whether passing over small obstructions in the highway or being on a different inclination than the vehicle. Each of the devices 60,62 can respond differently, since each is independently vertically movable through the cylindrical bushing 42 which rotates independently at opposite ends of the axle beam 34. Thus, device 62 relatively to device 60 can be at the same, a higher, or lower, level.

For the same reasons, the vehicle and the auxiliary load-carrying devices can be in different inclinations, as illustrated in FIG. 4.

The front set of wheels 78 of each device can move relatively to the rear set of wheels by virtue of the hinge, or pivot, connection 74, allowing the sets of wheels to move over obstructions in the form of stones or other irregularities in the terrain, and the camber of the wheels 78,80 can vary, since they are attached through axles 84 to a set of leaf springs 72 which are torsionally yieldable. Thus, the camber of the wheels can vary according to the crown of the road, or in the event that one of the wheels of a pair of wheels is externally loaded to a greater extent by hitting an obstruction.

As a result of the foregoing, not only are the respective devices 60,62 independently positionable, but so, also, are the respective sets of front and rear wheels 78,80 of each device 60,62. Because of this described combination of articulated connections, each wheel, while sustaining a relatively constant normal force of ground engagement, which serves the function of relieving axle loading on the vehicle, will in no way impart objectionable external forces to such towing vehicle to produce unstable conditions during vehicle turning. Similarly, road shocks which are sustained by the auxiliary load-carrying device, are fully absorbed by the device and without transmitting instability-creating force back to the vehicle.

Once the wheels 78,80 of each device are in ground engagement, they contribute vertical support to the vehicle at all times, regardless of conditions of terrain or vehicle movement. The wheels ride up and over obstructions, travel either in the same or different inclination as the vehicle, and are resiliently supported through the leaf spring beam, through the compound articulated connections consisting of the king pin axle 50, sleeve bearing 42, hinge connection 74, and torsional resilience obtained by mounting axles 84 at the opposite ends of leaf springs. Through a combination of these movements, the wheels in the auxiliary load-carrying devices can sustain normal loads in any attitude or position whether the same as, or dissimilar from, the towing vehicle.

Another important feature of the present invention is that, as the device is retracted, or swung to an upper position, it automatically assumes its correct position by means of a two-stage retraction, which will next be described.

Referring to FIGS. 3,4, because the hinge connection 74 between linkage 64 and leaf spring member 72 is forwardly offset from the balance point, lifting action exerted through hinge 74 causes first the front wheels 78 to pick up and their axle 84 engages with the undersurface of the linkage 64. This engagement serves to locate the wheels 78,80 and leaf springs 72 in relation to linkage 64 so that as the linkage 64 continues to be rotated upwardly the device 60 as a whole is next swung upwardly along arc 150 described by the dot-dash line in FIG. 3. The devices 60,62 are located automatically in relation to the raising mechanism and without need for any operator intervention to locate the parts of the auxiliary load-carrying devices 60,62.

All that is needed to raise the device is to effect retractile movement of the piston rod 94 by introducing fluid pressure within chamber 120 (FIG. 6) and at the end of the stroke of the piston 92 within cylinder 90, the auxiliary load-carrying devices are fully raised.

This raising and lowering is remotely accomplished within the cab by means of the handle 114 which is moved from a neutral position either to the "L" positon which lowers the auxiliary load-carrying devices, or raising them by moving the lever from the "N", or neutral, position, to the "R" position, which is the raise, or carry, position. Each device 60,62 is selectively lowered as well, and with a preferred normal pressure.

Each set of wheels 78,80 can be equipped, if desired, with fenders 140 which shield the tires and prevent splash.

Although the present invention has been illustrated and described in connection with a single set of example embodiments, it will be understood that this is illustrative of the invention and is by no means restrictive thereof. It is reasonably to be assumed that those skilled in this art can make numerous revisions and adaptations of the invention and that it is intended that such revisions and adaptations of the invention will be included within the scope of the following claims as equivalents of the invention.

What is claimed is:

1. A process for providing supplementary load-carrying support for a load-carrying vehicle comprising the steps of: imposing through a compound angle support which provides for both vertical raising and lowering of the wheels and castering thereof, a relatively constant force upon support wheels, and resiliently constraining each of said wheels individually through a torsion means which provides flexure of the tire and tire support in a lateral sense.

2. The process in accordance with claim 1 including the step of exerting through a pressurized fluid medium a substantially constant force upon said auxiliary load-supporting wheels to maintain a substantially constant lifting effort on the vehicle regardless of the in-line or non-in-line condition of the vehicle and auxiliary support device as the combination moves over crest and dip road conditions.

3. The process in accordance with claim 1, including the step of continuously maintaining a constant effort on said auxiliary wheel support device to effect a substantially constant normal force of engagement between the ground and the auxiliary wheel support device to prevent instability of the driving and steering wheels of the vehicle.

4. The process in accordance with claim 3 including the steps of applying differential normal force through the auxiliary wheel support at the respective lateral sides of the vehicle to compensate for unequal vehicle loads.

5. The process in accordance with claim 1 in which the auxiliary wheel support mechanism is in combination with a self-transit concrete mixer unit having a rear discharge chute and hopper and including the steps of: vertically rotating the forward wheels of said auxiliary support mechanism to a raised position to be nonobstructive with movement of said chute and the upper one of said wheels sufficiently raised to be nonobstructive with the charge hopper.

6. The process for raising and lowering an auxiliary wheel support mechanism for vehicles comprising the steps of: applying a lifting force on the vehicle through a longitudinal support member having a support wheel set consisting of one wheel at each of opposite ends of said support member and in which the lifting force is offset from the geometric center line of said longitudinal support member, effecting a raising action first upon the forward wheel of said set of wheels to bring a portion of said auxiliary wheel support mechanism into contact with a recess of the lifting arm adapted to retain the portions in such recessed position, and thereafter pivoting the entire wheel support mechanism upwardly to exert raising movement of the rear wheel of said auxiliary support mechanism whereby such rear wheel is raised to a vertical position, higher than its associated forward wheel, and completely out of ground contact.

7. A process for providing auxiliary load-carrying support for self-transit concrete mixers comprising the steps of: applying a normal force of ground engagement through a compound linkage upon auxiliary load-carrying devices, one at each side of the vehicle and consisting of a flexible, elongated member having a pair of ground engaging wheels at opposite ends of the respective elongated members, raising such devices in stages to out-of-ground engagement position by effecting in sequence a vertical raising effort on said longitudinal members at a point offset from the center thereof to effect first lifting out of ground engagement of the forward ones of the respective wheels of said load-carrying device and bringing portions of said device into engagement with recessed members, continuing to effect lifting action through said offset connections to produce progressive pivotal movement of said auxiliary load-carrying devices about their engagement with said recessed member until the rear wheels of the respective auxiliary load-carrying devices are pivoted to raised positions above the level of said forward wheels.

8. The process in accordance with claim 7 in which said forward wheels are disposed vertically above the center of gravity of the vehicle and the lower wheels are disposed below the center of gravity of the vehicle to be in offsetting relation.

9. The process in accordance with claim 8 including the step of disposing the forward wheels of said auxiliary load-carrying device in direct proximity with the rear of the vehicle to provide load support in a manner minimizing shift of load to the forward axle of the towing vehicle.

* * * * *